United States Patent
Wendorf et al.

(10) Patent No.: US 7,450,510 B1
(45) Date of Patent: Nov. 11, 2008

(54) SYSTEM AND METHOD FOR DISTRIBUTING GUARANTEED BANDWIDTH AMONG SERVICE GROUPS IN A NETWORK NODE

(75) Inventors: Kent Wendorf, San Jose, CA (US); Hariprasad Ginjpalli, Cupertino, CA (US); Thinh Hau, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1033 days.

(21) Appl. No.: 09/839,957

(22) Filed: Apr. 19, 2001

(51) Int. Cl.
*H04J 1/16* (2006.01)
*H04J 3/14* (2006.01)
*H04L 1/00* (2006.01)
*H04L 12/26* (2006.01)
*H04L 12/28* (2006.01)
*H04L 12/56* (2006.01)

(52) U.S. Cl. .................... 370/235; 370/395.4; 370/412

(58) Field of Classification Search .................. 370/230, 370/230.1, 232, 235, 412–416
See application file for complete search history.

(56) References Cited

U.S. PATENT DOCUMENTS

| | | | |
|---|---|---|---|
| 5,224,099 A | 6/1993 | Corbalis et al. | |
| 5,313,454 A | 5/1994 | Bustini et al. | |
| 5,359,592 A | 10/1994 | Corbalis et al. | |
| 5,436,891 A | 7/1995 | Grossman et al. | |
| 5,533,020 A | 7/1996 | Byrn et al. | |
| 5,835,494 A * | 11/1998 | Hughes et al. | 370/397 |
| 5,838,915 A | 11/1998 | Klausmeier et al. | |
| 6,002,667 A | 12/1999 | Manning et al. | |
| 6,011,798 A | 1/2000 | McAlpine | |
| 6,034,945 A | 3/2000 | Hughes et al. | |
| 6,061,348 A | 5/2000 | Castrigno et al. | |
| 6,067,298 A | 5/2000 | Shinohara | |
| 6,088,736 A | 7/2000 | Manning et al. | |
| 6,208,661 B1 | 3/2001 | Marshall | |
| 6,324,165 B1 | 11/2001 | Fan et al. | |
| 6,359,891 B1 | 3/2002 | Bergantino et al. | |
| 6,408,005 B1 * | 6/2002 | Fan et al. | 370/412 |
| 6,424,624 B1 | 7/2002 | Galand et al. | |
| 6,430,191 B1 | 8/2002 | Klausmeier et al. | |
| 6,445,707 B1 | 9/2002 | Iuoras et al. | |
| 6,512,743 B1 | 1/2003 | Fang | |
| 6,526,060 B1 | 2/2003 | Hughes et al. | |
| 6,526,062 B1 | 2/2003 | Milliken et al. | |
| 6,535,484 B1 | 3/2003 | Hughes et al. | |
| 6,654,374 B1 | 11/2003 | Fawaz et al. | |

(Continued)

OTHER PUBLICATIONS

Stallings, William, High-Speed Networks: TCP/IP and ATM Design Principles,1998, pp. 359-362, Prentice Hall, Upper Saddle River.

(Continued)

*Primary Examiner*—Daniel J. Ryman
(74) *Attorney, Agent, or Firm*—Blakely, Sokoloff, Taylor & Zafman LLP

(57) ABSTRACT

A system and method for distributing guaranteed bandwidth among service groups in a network node are described. A position on a time scale of a buffer containing multiple data units is determined. A signal prompting selection of said buffer for release of at least one data unit of the data units is modified based on the position determined on the time scale.

20 Claims, 5 Drawing Sheets

U.S. PATENT DOCUMENTS

| | | |
|---|---|---|
| 6,657,962 B1 | 12/2003 | Bari et al. |
| 6,661,802 B1 | 12/2003 | Homberg et al. |
| 6,714,517 B1 | 3/2004 | Fawaz et al. |
| 6,810,012 B1 | 10/2004 | Yin et al. |
| 6,947,380 B1 | 9/2005 | Yip et al. |
| 7,130,267 B1 | 10/2006 | Wendorf et al. |
| 2003/0133406 A1 | 7/2003 | Fawaz et al. |

OTHER PUBLICATIONS

Stallings, William, ISDN and Broadband ISDN with Frame Relay and ATM, 1998, pp. 460-465, 4th Ed., Prentice Hall, Upper Saddle River.

Discussion of prior art (i.e., art dated prior to Apr. 19, 2001) set forth in Information Disclosure Statement Transmittal attachment hereto.

* cited by examiner

US 7,450,510 B1

SYSTEM AND METHOD FOR DISTRIBUTING GUARANTEED BANDWIDTH AMONG SERVICE GROUPS IN A NETWORK NODE

FIELD OF THE INVENTION

The present invention relates generally to telecommunications systems and, more particularly, to a system and method for distributing guaranteed bandwidth among service groups in a network node.

BACKGROUND OF THE INVENTION

An Asynchronous Transfer Mode (ATM) is a switching and multiplexing technique designed for transmitting digital information, such as data, video, and voice, at high speed, with low delay, over a telecommunications network. The telecommunications network, for example an ATM network, includes a number of switching nodes coupled through communication links. In the ATM network, bandwidth capacity is allocated to fixed-sized data units named "cells." The communication links transport the cells from a switching node to another. These communication links can support many virtual connections, also named channels, between the switching nodes. The virtual connections assure the flow and delivery of information contained in the cells.

Each cell contains a cell header and cell data. The cell header includes information necessary to identify the destination of that cell. The components of the cell header include, among other things, a Virtual Channel Identifier (VCI) and a Virtual Path Identifier (VPI), for collectively identifying an ATM connection for that particular cell, and a Payload Type Identifier (PTI), for indicating whether the cell is sent from one user to another, whether cell data refers to administration or management traffic, and whether congestion is present within the network.

The ATM Forum, which is a user and vendor group establishing ATM standards, has also defined several ATM class of service categories, used in characterization of a virtual connection, for example, (1) a Constant Bit Rate (CBR), which supports a constant or guaranteed rate to transport services, such as video or voice, as well as circuit emulation, which requires rigorous timing control and performance parameters; (2) a Variable Bit Rate (VBR), real time and non real time, which supports variable bit rate data traffic with average and peak traffic parameters; (3) an Available Bit Rate (ABR), which supports feedback to control the source rate in response to changed characteristics in the network; and (4) an Unspecified Bit Rate (UBR).

SUMMARY OF THE INVENTION

A system and method for distributing guaranteed bandwidth among service groups in a network node are described. A position on a time scale of a buffer containing multiple data units is determined. A signal prompting selection of said buffer for release of at least one data unit of the data units is modified based on the position determined on the time scale.

Other features and advantages of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

According to embodiments described herein, a system and method for distributing guaranteed bandwidth among service groups in a network node are described. The following discussion is presented in the context of an Asynchronous Transfer Mode (ATM) network. It should be understood that the present invention is not limited to ATM networks and may be implemented with other types of networks.

Figure 1:
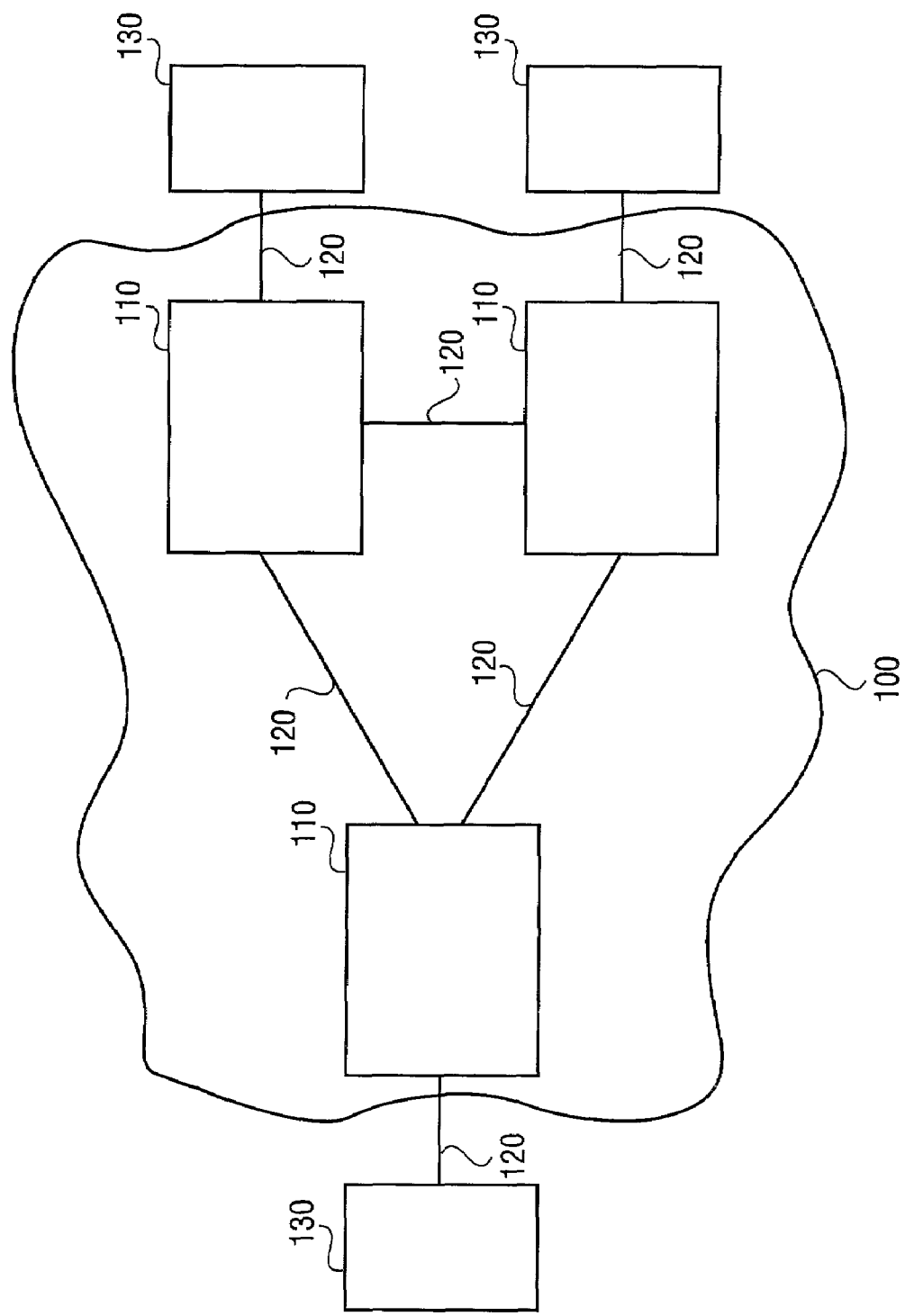
FIG. 1 is a block diagram of one embodiment for a network.

FIG. 1 is a block diagram of one embodiment for a network. As illustrated in FIG. 1, in one embodiment, network 100 includes several network nodes 110 connected through single communication links 120. In one embodiment, network 100 is a data transmission network with guaranteed bandwidth and quality of service requirements, for example an Asynchronous Transfer Mode (ATM) network. Alternatively, network 100 may be another type of data transmission network with guaranteed bandwidth and quality of service requirements.

In one embodiment, network nodes 110 are located in the middle of the network 100. Alternatively, nodes 110 may also be located at the edges of the network 100. Users 130 access the network 100 and connect to the network nodes 110 via similar communication links 120. In one embodiment, the illustrated communication links 120 support multiple virtual connections.

Figure 2:
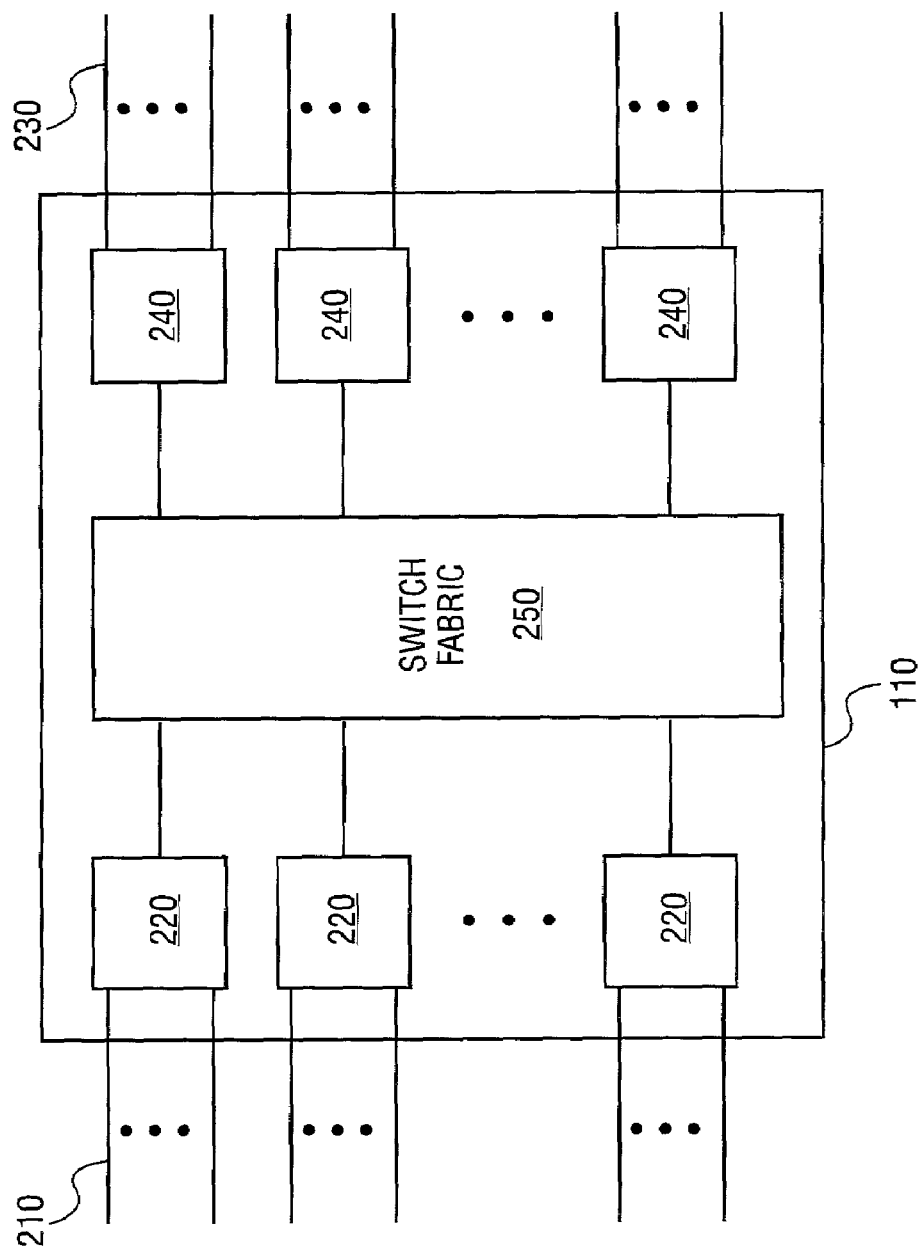
FIG. 2 is a block diagram of one embodiment for a network node within the network.

FIG. 2 is a block diagram of one embodiment for a network node within network 100. As illustrated in FIG. 2, in one embodiment, network node 110, for example an ATM switching node, receives information, such as data, along multiple input virtual connections 210 within communication link 120. In one embodiment, the information transmitted along virtual connections 210 is incorporated in multiple data units, for example communication cells. In one embodiment, the cells used to transmit information are data cells. Alternatively, transmitted cells may include other types of cells, for example control cells.

In one embodiment, switching node 110 receives data units along input virtual connections 210 and transfers the data units to multiple ingress line cards 220 described in detail below. Each ingress line card 220 is further coupled to a corresponding egress line card 240 through switch fabric 250. The data units or cells received by egress line cards 240 are then transmitted along multiple output virtual connections 230 to a destination node 110. In one embodiment, multiple output virtual connections 230 are coupled to each egress line card 240 and transmit the cells to destination node 110.

Figure 3:
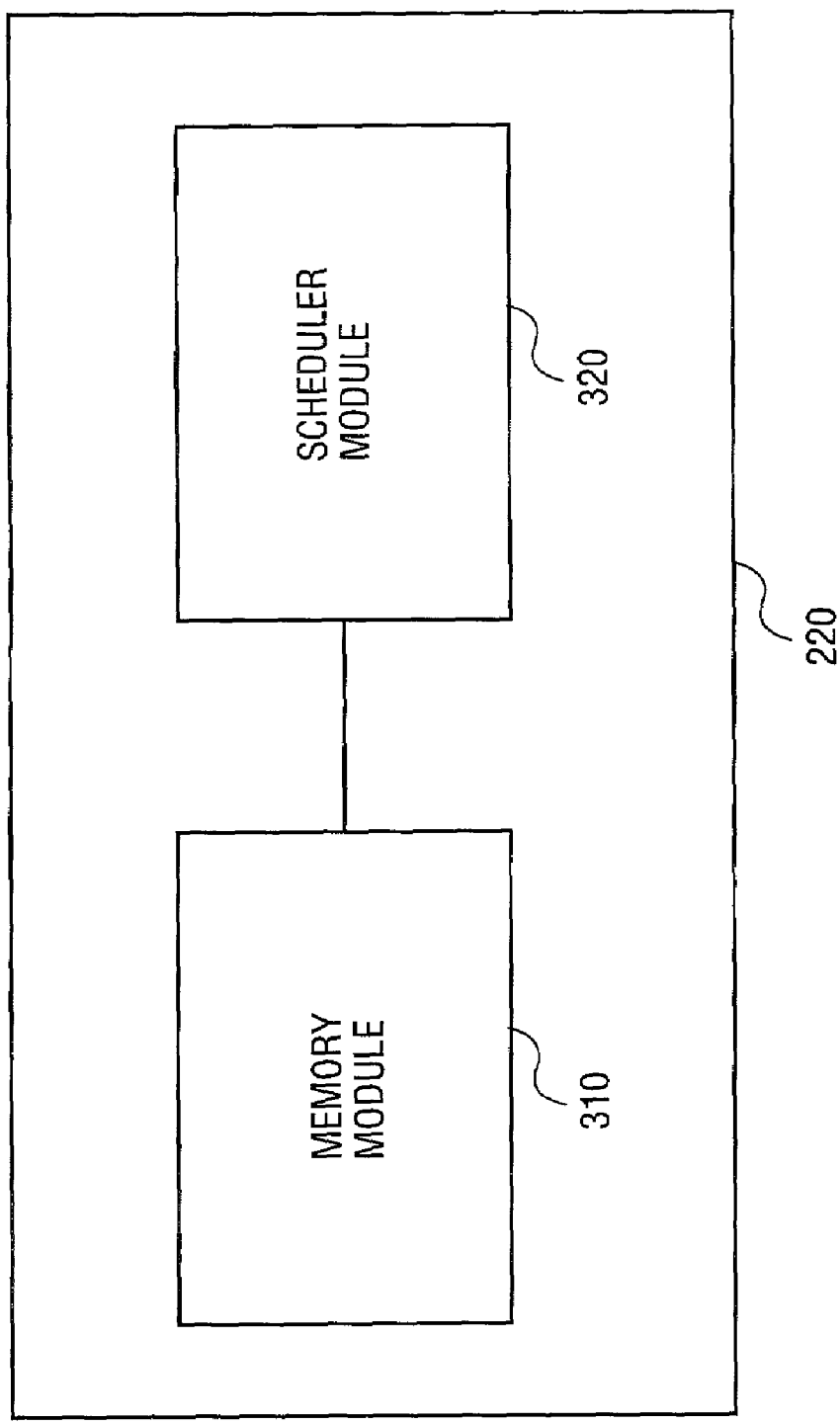
FIG. 3 is a block diagram of one embodiment for a line card within the network node.

FIG. 3 is a block diagram of one embodiment for a line card within network node 110. As illustrated in FIG. 3, in one embodiment, ingress line cards 220 and egress line cards 240 have similar structures. Although the following discussion is presented in connection with an ingress line card 220, it is to be understood that it also refers to egress line cards 240.

In one embodiment, ingress line card 220 includes a memory module 310 and a scheduler module 320, coupled to the memory module 310. In one embodiment, the memory module 310 stores cells received along the multiple virtual connections 210.

In one embodiment, the scheduler module 320 monitors transmission of data and selects stored cells to be transmitted along the output virtual connections 230. The memory module 310 and the scheduler module 320 will be described in further detail below.

Figure 4:
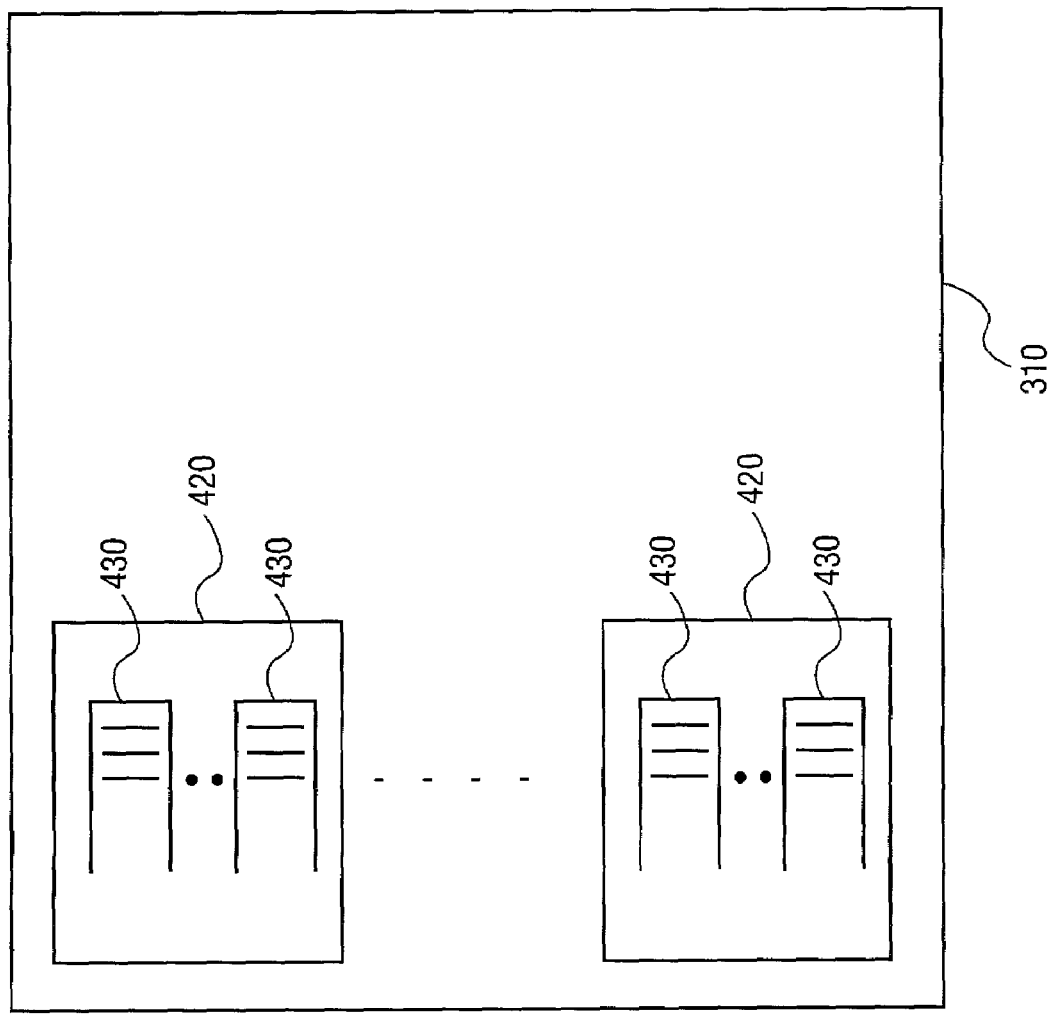
FIG. 4 is a block diagram of one embodiment for a memory module within the line card.

FIG. 4 is a block diagram of one embodiment for a memory module within the ingress line card 220 or egress line card 240. As illustrated in FIG. 4, in one embodiment, memory module 310 includes multiple service groups 420 containing buffers 430 for storing the cells transmitted along the input virtual connections 210. Each buffer 430 within each service group 420 corresponds to one ATM class of service category used in the characterization of each virtual connection 210, for example CBR, VBR, ABR, or UBR.

Cells arriving along input virtual connections 210 into the network node 110 are identified based on their respective ATM header, which includes the virtual path identifier (VPI) and the virtual channel identifier (VCI). In one embodiment, each cell is classified based on its corresponding ATM header and a corresponding service group 420 is determined. The cell is then stored in a buffer 430 corresponding to the determined service group and class of service category.

Scheduler module 320 selects service groups 420 and buffers 430 and retrieves cells according to predetermined maximum service rates for each service group. The service rates are programmed with a predetermined departure parameter, called Inter Cell Gap (ICG) parameter, which specifies the minimum time gap between successive departures of cells.

In order to transmit the stored cells along the output virtual connections 230, service groups 420 must be selected and cells must depart from the service groups at scheduled times. The scheduling of service groups 420 uses a Theoretical Departure Time (TDT) variable parameter attached to each service group 420. The TDT parameters for service groups 420 are fixed in a time scale and are spaced by their corresponding ICG. The scheduler module 320 uses the ICG to calculate the next TDT parameter of each service group 420 for a future selection. If the TDT parameter of a service group 420 is less than or equal to a current time counter value on the time scale, then the service group 420 is eligible to release cells to be transmitted on an output virtual connection 230.

The scheduler module 320 also monitors the number of cells available within each service group 420. With each arrival of cells, a cell counter for each service group 420 is incremented. With each selection of a service group 420, after cells depart the service group, the cell counter is decremented. If the TDT parameter for a service group 420 is less than or equal to the current time counter, cells may depart the selected service group 420, provided that the corresponding cell counter is not zero, showing an empty service group 420.

At a predetermined selection time, more than one service groups 420 may be eligible and thus contending for selection of a service group. Scheduler module 320 selects the service group 420 having the lowest TDT parameter on the time scale among all the eligible service groups. The remaining service groups 420 are subsequently serviced based on their corresponding TDT parameters. After a service group 420 is selected, its corresponding TDT parameter is updated with its specific ICG in preparation for the next selection of a service group to be serviced.

Cells must depart from buffers 430 within the selected service group 420 at scheduled times. The scheduling of buffers 430 within the selected service group 420 uses a Theoretical Departure Time (TDT) variable buffer parameter attached to each buffer 430 within the corresponding service group 420. The TDT variable buffer parameters for the buffers 430 are fixed in a time scale and are spaced by their corresponding ICG. The scheduler module 320 uses the ICG to calculate the next TDT buffer parameter value of the buffer 430 for a future selection. If the TDT parameter of a buffer 430 is less than or equal to a current time counter value on the time scale, then that buffer 430 is not meeting its minimum bandwidth requirements and becomes eligible to release cells to be transmitted on an output virtual connection 230.

The scheduler module 320 also monitors the number of cells available within each buffer 430. With each arrival of cells, a cell counter within each buffer 430 is incremented. With each selection of a buffer 430, after cells depart the selected buffer, the cell counter of the selected buffer 430 is decremented. If the TDT buffer parameter is less than or equal to the current time counter, cells may depart the selected buffer 430, provided that the corresponding cell counter is not zero, showing an empty buffer 430.

At a predetermined selection time, more than one buffer 430 may be eligible and thus contending for buffer selection. The scheduler module 320 selects the buffer 430 having the lowest TDT buffer parameter on the time scale to be serviced first. The remaining buffers 430 are subsequently serviced based on their corresponding TDT buffer parameters. After the buffer 430 having the lowest TDT buffer parameter is selected, its corresponding TDT buffer parameter is updated with its specific ICG in preparation for the next selection of a buffer 430 to be serviced.

In one embodiment, in the network switching node 110, quality of service features allow a certain rate of traffic transmitted along links 120 to be guaranteed, for example a certain minimum cell rate is specified for one class of service. On an ingress path into the switch fabric 250 of the switching node 110, the guaranteed traffic through an ingress line card 220 may compete for bandwidth with best effort traffic received through other ingress line cards 220.

In one embodiment, the switch fabric 250 primarily uses a static method of selection of traffic, for example a round robin method from each ingress line card 220 to each egress line card 240. When the incident traffic destined for a particular egress line card 240 equals or exceeds a physical transmission rate of the egress line card 240, and the minimum guaranteed rates of one or more ingress line cards 220 exceed what is distributed by the round robin method of allocation performed by the switch fabric 250, an unfair bandwidth distribution may result, i.e. excess bandwidth traffic may be selected by the switch fabric 250 from one ingress line card 220, while minimum guaranteed bandwidth traffic from other one or more ingress line cards 220 is not satisfied.

When a service group 420 within an ingress line card 220 fails to meet its minimum guaranteed bandwidth, a speed-up signal is asserted for that particular service group 420. By monitoring the speed-up signal, the scheduler module 320 can prioritize the selection of the service groups 420 by dynamically determining the guaranteed bandwidth requirements of the buffers 430 within the memory module 310 and distributing the entire bandwidth among the service groups 420 under speed-up conditions.

Speed-up is implemented with a speed-up counter per service group 420 and with global set and reset thresholds. The speed-up counter is incremented, decremented, or cleared, depending on the region where selected buffers 430 within a service group 420 are located. If the selected buffer 430 is in the guaranteed bandwidth region, where its TDT buffer parameter is lower than the current time counter value CT, then it must be serviced in order to meet its minimum guaranteed bandwidth requirements. If the selected buffer 430 is in the excess bandwidth region, where the TDT buffer parameter is greater than the current time counter value CT, then it has met its minimum guaranteed bandwidth and, if serviced, will send excess bandwidth to the destination.

When a selected buffer 430 within the service group is not meeting its minimum guaranteed bandwidth, the speed-up counter increments for each selection and reaches the set threshold, where the speed-up signal is asserted for the service group 420. When speed-up is asserted, and the selected buffer 430 within the service group has met its minimum guaranteed bandwidth, the speed-up counter decrements for each selection and reaches the reset threshold, where the speed-up signal is de-asserted. The count is updated for every cell that is released from buffer 430.

In one embodiment, the scheduler module 320 determines the position on a time scale of a buffer 430 within the service group 420 based on its TDT buffer parameter and the current time counter. If the TDT buffer parameter is greater than the current time counter value, then the buffer 430 is in the excess bandwidth region. As a result, the speed-up signal must be deasserted and the speed-up counter must be reset.

If the TDT buffer parameter is lower than the current time counter value, and if the difference between the current time counter value and the TDT buffer parameter is greater than twice the corresponding ICG of the buffer, the buffer 430 is selected and the speed-up signal is asserted or maintained. At the same time, the speed-up counter is incremented. The TDT buffer parameter of the selected buffer 430 is subsequently updated with the corresponding ICG value. At this time, the speed-up signal is asserted and priority is given to the buffer 430 to satisfy the guaranteed bandwidth of buffer 430. The procedure is repeated until the difference between the current time counter and the TDT buffer parameter becomes lower than twice the corresponding ICG of the buffer.

At the same time, the updated TDT buffer parameter is also compared to the current time counter. For each selection, the TDT buffer parameter is updated with the ICG value until the updated TDT parameter becomes higher than the current time counter value. Then, the speed-up counter is reset and the speed-up signal is deasserted. As a result, the bandwidth used by the increased traffic in the buffer 430 is accounted for as guaranteed bandwidth, thereby providing a means for allocating up to 100 percent of guaranteed bandwidth across ingress line cards 220 through the switch fabric 250 to a destination egress line card 240.

In one embodiment, several service groups 420 may have their respective speed-up signals asserted at the same time. In this embodiment, the scheduler module 320 further prioritizes the service group selection among the several service groups 420 having the speed-up signal asserted in order to ensure that only service groups 420 which are not meeting their respective guaranteed bandwidths are selected for increased traffic. In an alternate embodiment, other eligible service groups 420, but without the speed-up signal asserted, may compete with service groups having the speed-up signal asserted. In this embodiment, scheduler module 320 selects the service groups with speed-up signal over the service groups without speed-up signal.

In one embodiment, the speed-up signals from the service groups 420 are passed downstream to destination queues in order to prioritize the traffic across the switch for those service groups 420 demanding more bandwidth to satisfy their guaranteed bandwidth.

Figure 5:
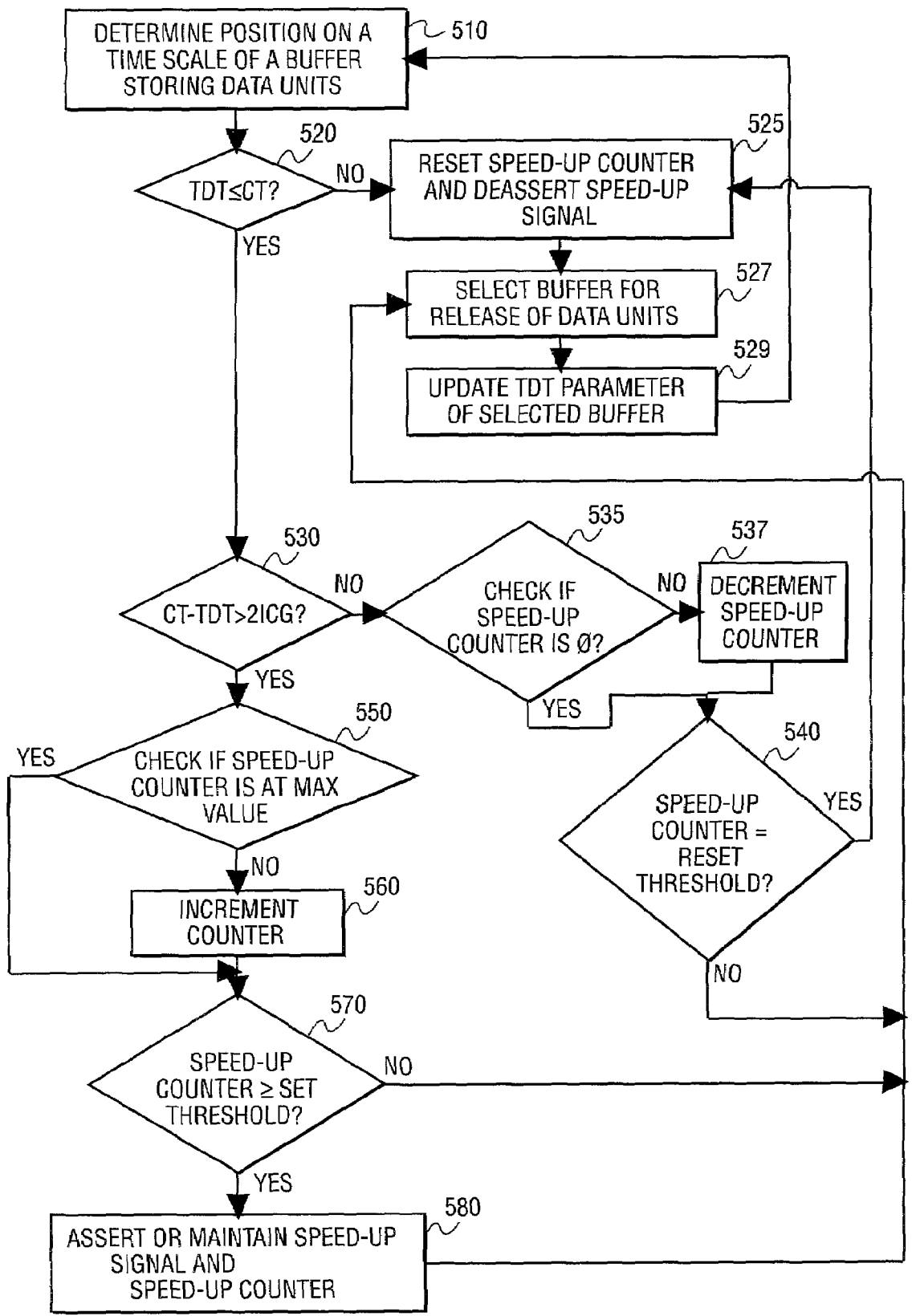
FIG. 5 is a flow diagram of one embodiment for a method for distributing guaranteed bandwidth among service groups in a network node.

FIG. 5 is a flow diagram of one embodiment for a method for distributing guaranteed bandwidth among service groups in a network node. According to FIG. 5, at processing block 510, the position on a time scale of a buffer storing data units is determined. In one embodiment, the TDT parameter of the buffer is ascertained.

At processing block 520, a decision is made whether the TDT parameter of the buffer is lower or equal to the value CT of the current time counter. If the TDT parameter of the buffer 430 is greater than the current time counter value, then at processing block 525, the speed-up counter is reset and the speed-up signal is deasserted. Next, at processing block 527, the buffer is selected for release of data units. At processing block 529, the TDT parameter of the selected buffer is updated with its corresponding ICG and blocks 510 through 529 are repeated.

Otherwise, if the TDT parameter of the buffer is lower or equal to the value of the current time counter, then at processing block 530, a decision is made whether the difference on the time scale between the value CT of the current time counter and the value of the TDT parameter is greater than twice the value of the inter cell gap (ICG).

If CT-TDT is lower than twice the ICG, then at processing block 535, a decision is made whether the speed-up counter is equal to zero. If the speed-up counter equals zero, then the process jumps to processing block 540. Otherwise, if the speed-up counter is not zero, then the speed-up counter is decremented at processing block 537.

Next, at processing block 540, after the speed-up counter is decremented, a decision is made whether the speed-up counter is equal to the reset threshold. If the speed-up counter is not equal to the reset threshold, the process jumps to processing block 527, where the buffer is selected for release of data units. Otherwise, if the speed-up counter is equal to the reset threshold, the process jumps to processing block 525, where the speed-up counter is reset and the speed-up signal is deasserted.

If the difference between the current time counter value CT and the TDT parameter of the buffer is greater than twice the ICG, at processing block 550, a decision is made whether the speed-up counter has reached a predetermined maximum value (MAX VALUE). If the speed-up counter is at MAX VALUE, then the process jumps to processing block 570. Otherwise, if the speed-up counter is below the MAX VALUE, at processing block 560, the speed-up counter is incremented.

At processing block 570, a decision is made whether the speed-up counter has reached a predetermined set threshold. If the speed-up counter is lower than the set threshold, the process jumps to processing block 527, where the buffer is selected for release of data units. Otherwise, if the speed-up counter is greater or equal to the set threshold, at processing block 580, the speed-up signal and the speed-up counter are asserted or maintained. The process then jumps to processing block 527, where the buffer is selected for release of data units.

It is to be understood that embodiments of this invention may be used as or to support software programs executed upon some form of processing core (such as the CPU of a computer) or otherwise implemented or realized upon or within a machine or computer readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media; flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer implemented method in which a computer performs the method comprising:
   providing a plurality of buffers to store data units, each of the plurality of buffers having an associated Inter Cell Gap (ICG) parameter, Theoretical Departure Time (TDT) parameter, speed-up counter, and speed-up signal;
   calculating the TDT parameter for each one of the plurality of buffers based on the ICG parameter;
   selecting one of the plurality of buffers having an asserted speed-up signal, if any, otherwise selecting one of the plurality of buffers having a lowest TDT parameter;
   incrementing the speed-up counter associated with the selected buffer if a difference between a current time and the TDT parameter is greater than twice the ICG parameter, otherwise decrementing the speed-up counter;
   asserting the speed-up signal associated with the selected buffer if the speed-up counter associated with the buffer has reached a set threshold;
   deasserting the speed-up signal associated with the selected buffer if the speed-up counter associated with the buffer has reached a reset threshold;
   transmitting a data unit from the selected buffer; and
   updating the TDT parameter associated with the selected buffer for each data unit transmitted from the selected buffer.

2. The method according to claim 1, wherein the method is implemented in an Asynchronous Transfer Mode Network.

3. The method according to claim 1, wherein each of the plurality of buffers further has an associated cell counter, the method further comprising:
   incrementing the cell counter for each data unit stored in the buffer;
   decrementing the cell counter for each data unit transmitted from the buffer; and
   wherein selecting one of the plurality of buffers includes selecting one of the plurality of buffers with a cell counter having a non-zero count.

4. The method according to claim 1, the method further comprising receiving the plurality of data units along a plurality of input virtual connections in a network.

5. The method according to claim 1, the method further comprising deasserting the speed-up signal associated with the selected buffer and resetting the speed-up counter associated with the selected buffer if the TDT parameter is greater than the current time.

6. A system comprising:
   a memory module to store a plurality of buffers, each buffer containing a plurality of data units, each of the plurality of buffers having an associated Inter Cell Gap (ICG) parameter, Theoretical Departure Time (TDT) parameter, speed-up counter, and speed-up signal; and
   a scheduler module coupled to the memory module having a computer that:
      calculates the TDT parameter for each one of the plurality of buffers based on the ICG parameter;
      selects one of the plurality of buffers having an asserted speed-up signal, if any, otherwise selecting one of the plurality of buffers having a lowest TDT parameter;
      increments the speed-up counter associated with the selected buffer if a difference between a current time and the TDT parameter is greater than twice the ICG parameter, otherwise decrementing the speed-up counter;
      asserts the speed-up signal associated with the buffer if the speed-up counter associated with the buffer has reached a set threshold;
      deasserts the speed-up signal associated with the buffer if the speed-up counter associated with the buffer has reached a reset threshold;
      transmits a data unit from the selected buffer; and
      updates the TDT parameter associated with the selected buffer for each data unit transmitted from the buffer.

7. The system according to claim 6, wherein the system is a line card used in an Asynchronous Transfer Mode Network.

8. The system according to claim 6, wherein each of the plurality of buffers further has an associated cell counter and the computer further:
   increments the cell counter for each data unit stored in the buffer;
   decrements the cell counter for each data unit transmitted from the buffer; and
   selects from one of the plurality of buffers with a cell counter having a non-zero count.

9. The system according to claim 6, the system receiving the plurality of data units along a plurality of input virtual connections in a network.

10. The system according to claim 6, in which the computer further deasserts the speed-up signal associated with the selected buffer and resets the speed-up counter associated with the selected buffer if the TDT parameter is greater than the current time.

11. A system comprising:
   a plurality of buffers to store data units, each of the plurality of buffers having an associated Inter Cell Gap (ICG) parameter, Theoretical Departure Time (TDT) parameter, speed-up counter, and speed-up signal;
   means for calculating the TDT parameter for each one of the plurality of buffers based on the ICG parameter;
   means for selecting one of the plurality of buffers having an asserted speed-up signal, if any, otherwise selecting one of the plurality of buffers having a lowest TDT parameter;
   means for incrementing the speed-up counter associated with the selected buffer if a difference between a current time and the TDT parameter is greater than twice the ICG parameter, otherwise decrementing the speed-up counter;
   means for asserting the speed-up signal associated with the buffer if the speed-up counter associated with the buffer has reached a set threshold;
   means for deasserting the speed-up signal associated with the buffer if the speed-up counter associated with the buffer has reached a reset threshold;
   means for transmitting a data unit from the selected buffer; and
   means for updating the TDT parameter associated with the selected buffer for each data unit transmitted from the buffer.

12. The system according to claim 11, wherein the system is a line card used in an Asynchronous Transfer Mode Network.

13. The system according to claim 11, wherein each of the plurality of buffers further has an associated cell counter, the system further comprising:

means for incrementing the cell counter for each data unit stored in the buffer;

means for decrementing the cell counter for each data unit transmitted from the buffer; and wherein the means for selecting one of the plurality of buffers includes selecting one of the plurality of buffers with a cell counter having a non-zero count.

14. The system according to claim 11, the system further comprising means for receiving the plurality of data units along a plurality of input virtual connections in a network.

15. The system according to claim 11, the system further comprising means for deasserting the speed-up signal associated with the selected buffer and resetting the speed-up counter associated with the selected buffer if the TDT parameter is greater than the current time.

16. A computer readable medium storing executable instructions, which, when executed in a computer, cause the computer to perform a method comprising:

providing a plurality of buffers to store data units, each of the plurality of buffers having an associated Inter Cell Gap (ICG) parameter, Theoretical Departure Time (TDT) parameter, speed-up counter, and speed-up signal;

calculating the TDT parameter for each one of the plurality of buffers based on the ICG parameter;

selecting one of the plurality of buffers having an asserted speed-up signal, if any, otherwise selecting one of the plurality of buffers having a lowest TDT parameter;

incrementing the speed-up counter associated with the selected buffer if a difference between a current time and the TDT parameter is greater than twice the ICG parameter, otherwise decrementing the speed-up counter;

asserting the speed-up signal associated with the buffer if the speed-up counter associated with the buffer has reached a set threshold;

deasserting the speed-up signal associated with the buffer if the speed-up counter associated with the buffer has reached a reset threshold;

transmitting a data unit from the selected buffer; and updating the TDT parameter associated with the selected buffer for each data unit transmitted from the buffer.

17. The computer readable medium according to claim 14, wherein the computer is included in a line card used in an Asynchronous Transfer Mode Network.

18. The computer readable medium according to claim 16, wherein each of the plurality of buffers further has an associated cell counter, the method further comprising:

incrementing the cell counter for each data unit stored in the buffer;

decrementing the cell counter for each data unit transmitted from the buffer; and wherein selecting one of the plurality of buffers includes selecting one of the plurality of buffers with a cell counter having a non-zero count.

19. The computer readable medium according to claim 16, the method further comprising receiving the plurality of data units along a plurality of input virtual connections in a network.

20. The computer readable medium according to claim 16, the method further comprising deasserting the speed-up signal associated with the selected buffer and resetting the speed-up counter associated with the selected buffer if the TDT parameter is greater than the current time.

* * * * *